United States Patent [19]
Kaufman et al.

[11] Patent Number: 5,478,260
[45] Date of Patent: Dec. 26, 1995

[54] GROUNDING FOR ELECTRICAL CONNECTORS

[75] Inventors: John W. Kaufman, Hershey; John A. Root, Middletown, both of Pa.

[73] Assignee: The Whitaker Corporation, Wilmington, Del.

[21] Appl. No.: 283,312

[22] Filed: Jul. 29, 1994

[51] Int. Cl.$^6$ .................................................. H01R 13/648
[52] U.S. Cl. ............................................ 439/609; 439/108
[58] Field of Search ................................. 439/64, 59, 101, 439/108, 607, 609

[56] References Cited

U.S. PATENT DOCUMENTS

| | | | |
|---|---|---|---|
| 3,775,643 | 11/1973 | Schachnow et al. | 317/101 DH |
| 3,932,016 | 1/1976 | Ammenheuser . | |
| 4,046,443 | 9/1977 | Champagne . | |
| 4,583,807 | 4/1986 | Kaufman et al. . | |
| 4,732,365 | 3/1988 | Kloster | 254/10.5 |
| 4,756,696 | 7/1988 | Whiteman, Jr. | 439/79 |
| 4,846,727 | 7/1989 | Glover et al. | 439/608 |
| 4,861,277 | 8/1989 | Bina | 439/377 |
| 4,941,841 | 7/1990 | Darden et al. | 439/377 |
| 4,952,161 | 8/1990 | Komatsu | 439/155 |
| 4,992,052 | 2/1991 | Verhoeven | 439/62 |
| 5,035,631 | 7/1991 | Piorunneck et al. | 439/108 |
| 5,040,999 | 8/1991 | Collier | 439/108 |
| 5,051,101 | 9/1991 | Komatsu | 439/159 |
| 5,195,899 | 3/1993 | Yatsu et al. | 439/101 |
| 5,288,247 | 2/1994 | Kaufman | 439/607 |
| 5,399,105 | 3/1995 | Kaufman et al. | 439/609 |

OTHER PUBLICATIONS

Serial No. 08/235,617; filed Apr. 29, 1994; The Whitaker Corporation Case No. 15811.

Memory/PC Card Connector (Compatible with PCMCIA, Release 2.0); AMP Incorporated; Dec. 1991.
PC Card Standard, Release 2.0 Personal Computer Memory Card International Association (PCMCIA); Sep. 1991.
InterConnection Technology, IHS Group Publication; *Surface Mount Connector Hold Downs;* Aug. 1992.
Technical Paper; AMP; *Surface Mount Connector Hold Downs;* By: Henry B. Collins and Tim Kocher; Copyright 1991, by AMP Incorporated.

Primary Examiner—Khiem Nguyen
Attorney, Agent, or Firm—Katherine A. Nelson

[57] ABSTRACT

An electrical connector assembly 20 for a card reader including a housing 24 having opposed major and minor sides 26,30 defining a card receiving mouth 32, a plurality of conductive electrical terminals 36 disposed in the housing 24 and having portions 38 thereof extending into the mouth 32, and a conductive shroud 50 encircling the housing 24, the shroud 24 having inwardly spaced contact portions extending into the mouth 32 along at least one of the major sides 26 of the housing 24, the shroud contact portions being spaced from the electrical terminal portions 38 when the shroud 50 is assembled to the housing 24. The inwardly spaced contact portions can be spring fingers 54 extending into the mouth 32 from an edge 53 of the shroud 50 or dimples 254 expressed into the mouth from an outer surface of the shroud 250. At least one of the major walls 26 of the housing 24 includes a plurality of shroud contact receiving recesses 28 adapted to receive the shroud contact portions such that the shroud contact portions are closely adjacent a card receiving space 34 thereby being positioned to be either electrically engaged by corresponding raised conductive surfaces 84 on an outwardly facing conductive surface 82 of a shielded card 70 upon insertion of the shielded card into the mouth 32, or to remain spaced from surfaces of an unshielded card 170 upon inserting the unshielded card into the mouth 32.

17 Claims, 7 Drawing Sheets

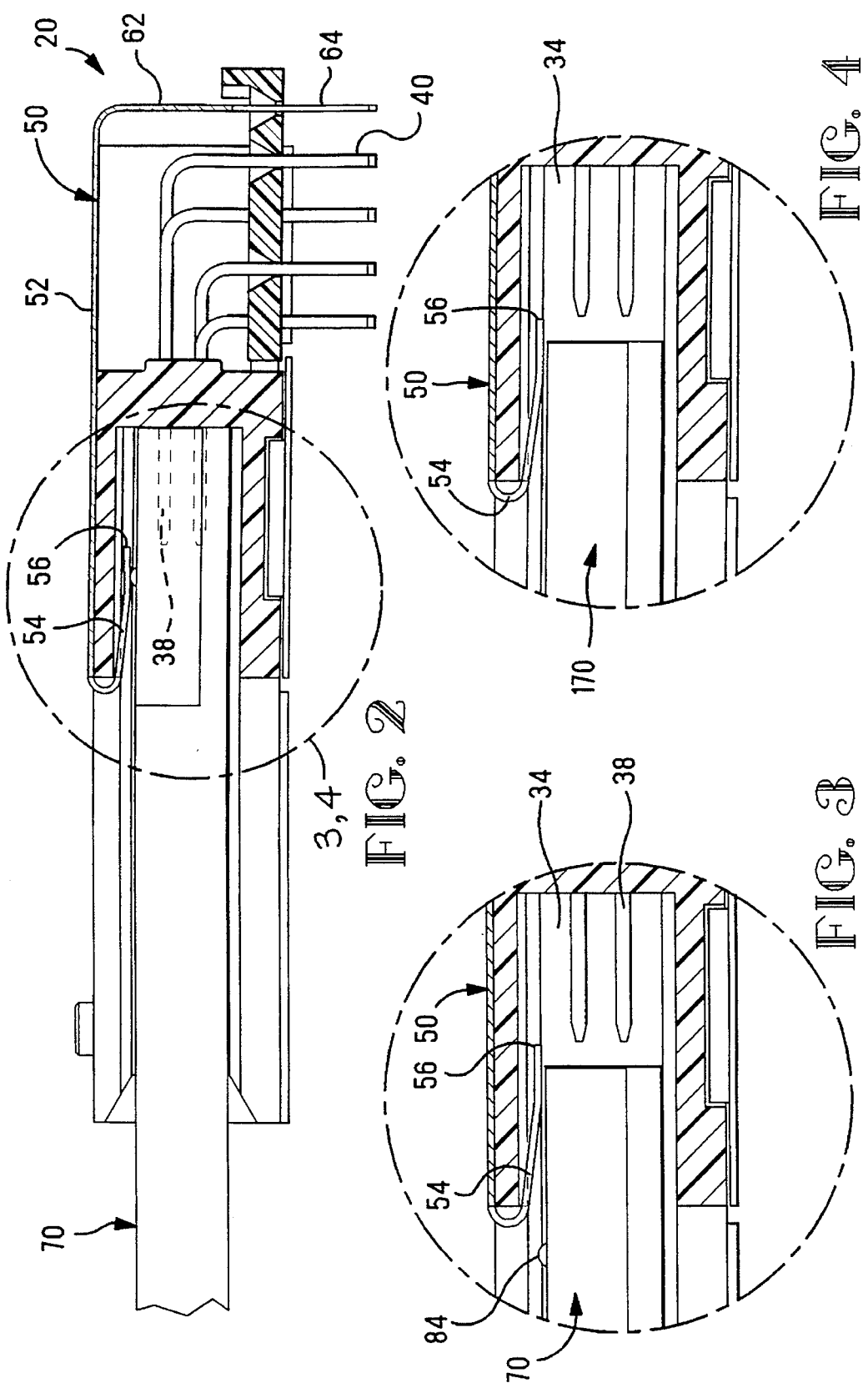

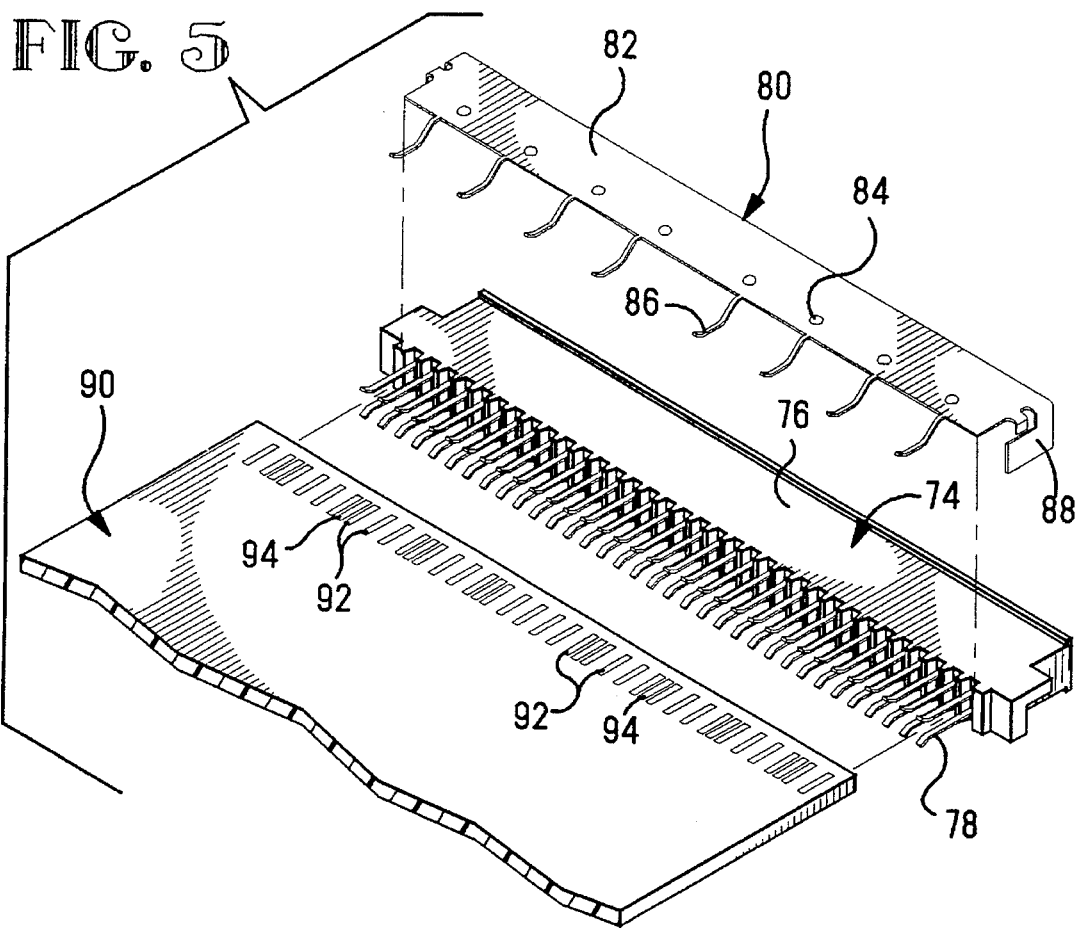
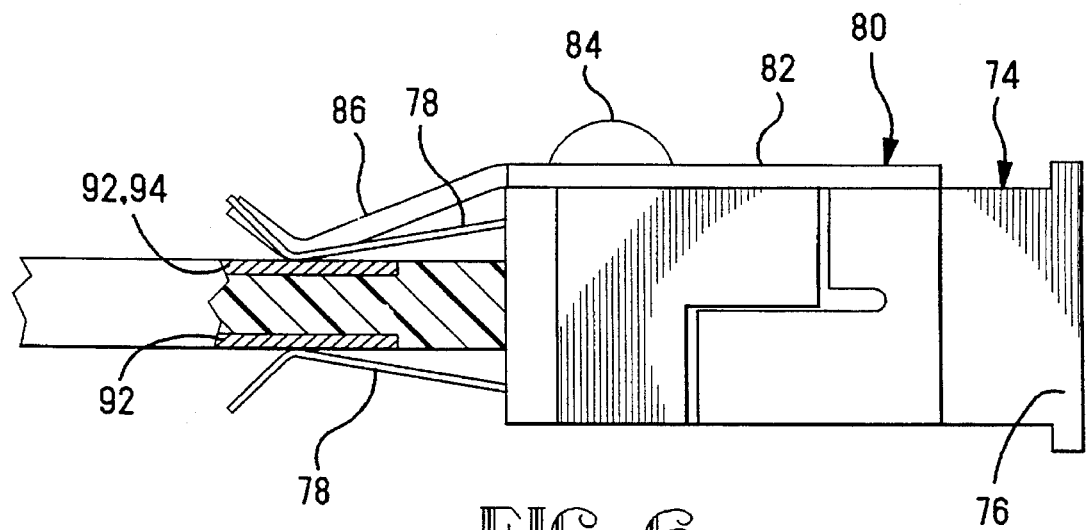

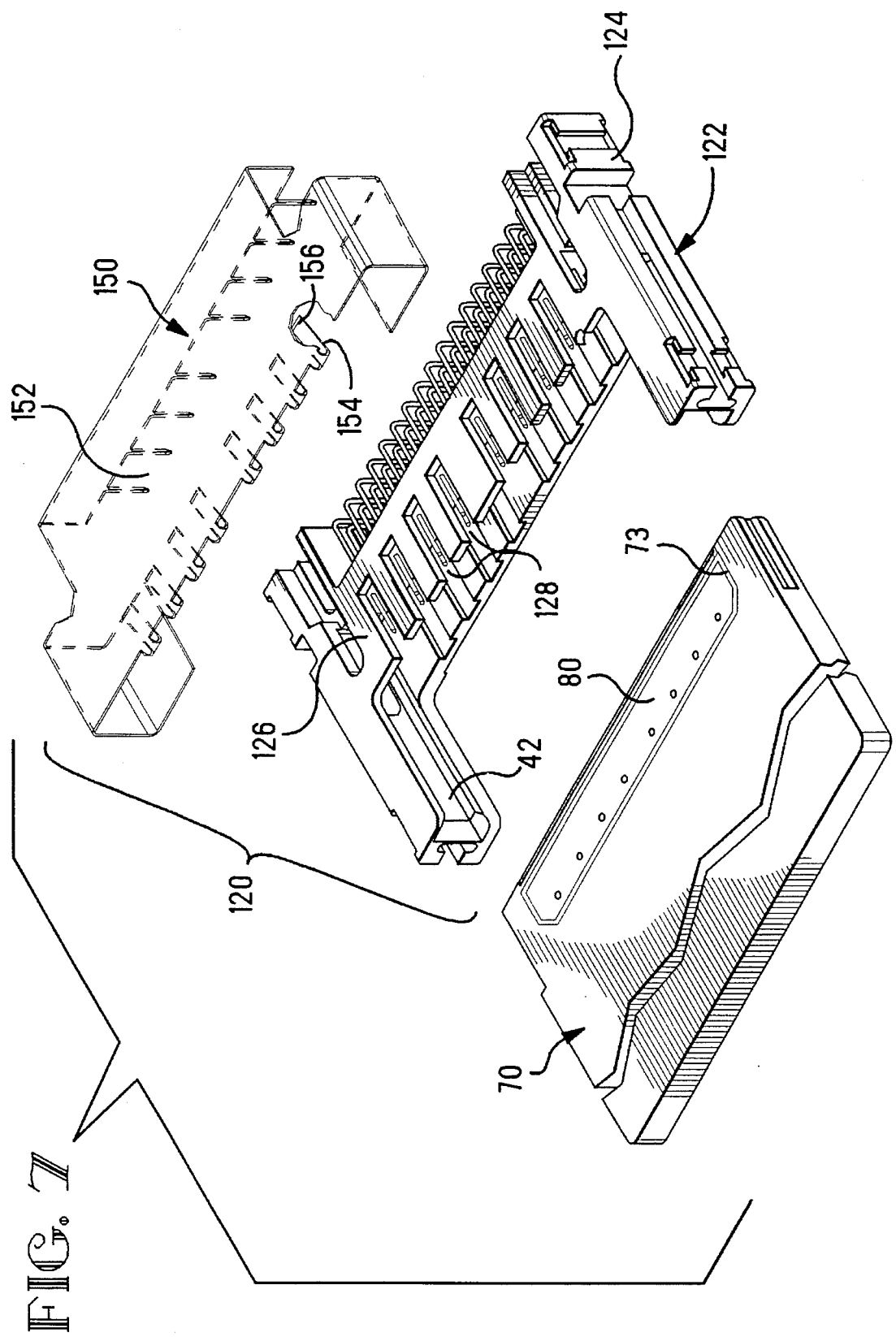

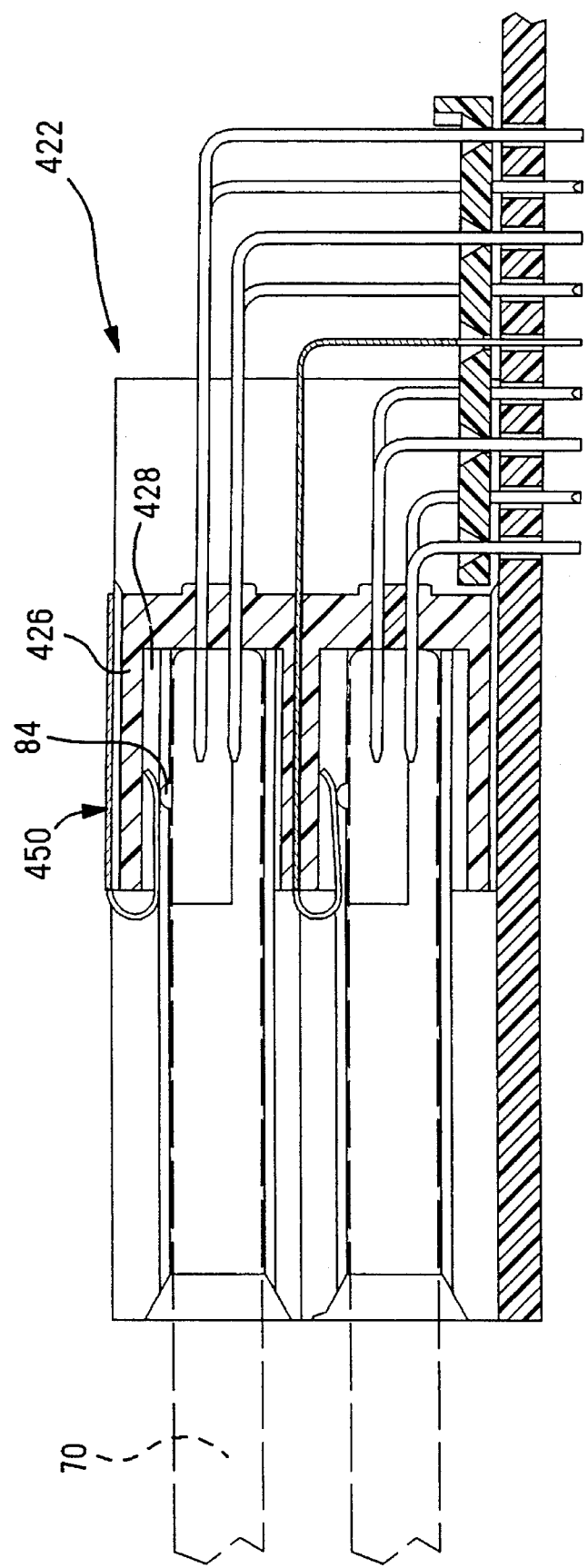

GROUNDING FOR ELECTRICAL CONNECTORS

FIELD OF THE INVENTION

The present invention relates to conductive shrouds used to provide a ground reference with respect to signal carrying pins in electrical connectors associated with the shroud and more particularly to a conductive shroud for use with a connector that can accept both grounded and ungrounded mating connectors.

BACKGROUND OF THE INVENTION

As part of its effort to standardize the interface of the electronic equipment, the electronic industry has established pin assignments for some of the connectors that will be used in the interface. For various computer applications, it is desirable to interconnect memory cards. A sixty-eight pin connector, for example, is often used. This connector has sixty signal pins, four ground return pins and four DC voltage pins, all of which are preassigned by the industry. The signal to ground ratio of an electrical connector is equal to the number of signal carrying pins divided by the number of ground return pins in the connector. For the purposes of the present disclosure the DC voltage pins can be considered similar in effect to the AC voltage ground pins, thus the signal to ground ratio of the sixty-eight pin connector is 7.5 to 1.0. Typically in computer applications multiple lines are simultaneously switched and all return current generated by this switching must be returned through one of the ground pins. The return current of eight or so signal pins, therefore, must be accommodated by a single ground pin. When the signal rise time is relatively slow, in the eight to ten nanosecond range, this presents no problem. When the rise time is increases, however, as in certain computer applications the induced voltage is increased resulting in "ground bounce" or common mode noise in the ground return pins. When the ground bounce reaches a high enough level, relative to the level of the signals, the systems may become unable to reliably read and respond to the signals thereby causing what is known in the industry as "false triggering". Since the pin assignments have been fixed by the industry, the signal to ground ratio cannot be altered. To reduce the adverse effects of the faster rise times a conductive shroud may be used to electrically interconnect the ground of the memory card to the ground of the equipment with which the card is being used.

One such shroud and a related connector are disclosed in U.S. Pat. No. 5,288,247, issued Feb. 22, 1994, to Kaufman. This patent is hereby incorporated by reference. The shroud of the '247 patent is arranged to enclose the top of the connector and two sides thereof. A shroud that will accept multiple connectors in a vertically stacked relationship that benefit from the improved performance of the single connector shroud is disclosed in U.S. Pat. No. 5,399,105 and also owned by the present assignee. This application is hereby incorporated by reference. The shrouds in the above two references include contacts that extend from the edge of the shroud and electrically engage a conductive outer surface of a memory card that is mated to the connector. Each of the shrouds is electrically connected to ground circuitry on a circuit board. The performance of the equipment is greatly improved by the use of such shrouds. The shrouds and connectors in the above references further retain the capacity to connect with existing memory cards that do not have conductive outer surfaces, nor grounding circuitry within the cards. A problem arises, however, with some of the older cards that use conductive covers but do not have the required ground interconnections within the memory card. Use of an improperly grounded card with the shrouds disclosed in the '247 patent or the '105 patent for example could cause electromagnetic interference. What is needed, therefore, is a connector and shroud assembly that will establish electrical connection to a properly grounded memory card while avoiding electrical connection with a card that has not been properly grounded, regardless of whether the card has an insulative or a conductive cover.

SUMMARY OF THE INVENTION

The present invention is directed to an improved shrouded electrical connector and grounded memory card that overcomes the deficiencies of the prior art. The conductive ground shroud is arranged for electrically engaging ground circuitry on the circuit board and provides a ground reference with respect to the pins.

The assembly includes an electrical connector and a grounding shroud. The electrical connector includes a housing having opposed major walls and minor sides defining a module receiving mouth, a plurality of conductive electrical terminals disposed in the housing and having portions thereof extending into the module receiving mouth. The conductive shroud that encircles the housing has inwardly spaced contact portions extending into the mouth along at least one of the major walls of the housing. The shroud contact portions are spaced from the electrical terminals in the assembled article. At least one of the major walls of the housing includes at least one shroud contact receiving recess extending at least partially outwardly to the leading edge of the module receiving mouth and at least partially to an outer housing surface from an inner surface of the wall. The at least one recess is adapted to receive the shroud contact portions therein upon connector assembly such that engageable portions of the shroud contact portions are closely adjacent the module receiving mouth. The shroud contact portions are thereby positioned to be either electrically engaged by corresponding raised conductive surfaces on an outwardly facing conductive surface of a shielded module upon insertion of the shielded module into the module receiving mouth, or to remain spaced from surfaces of an unshielded module upon inserting the unshielded module into the mouth. The connector assembly of the present invention is, therefore, suitable for use with shielded as well as unshielded modules, such as memory cards.

In the preferred embodiment, the inwardly spaced contact positions are a plurality of spring fingers extending from a forward edge thereof and which upon assembly to the housing extend into a card receiving area of the connector and are disposed in respective finger receiving recesses in at least one of the major housing walls. The recesses extend at least partially outwardly to the leading edge of the connector receiving mouth. The spring fingers include engagable portions adjacent the card receiving space and are positioned to be electrically engaged by corresponding raised conductive surfaces on an outwardly facing conductive surface of a shielded card upon insertion of the shielded card into the card receiving space. The spring fingers remain spaced from surfaces of cards incorporating raised conductive surfaces.

In an alternative embodiment, the inwardly spaced contact portions of the shield are dimples that are expressed into the mouth of the connector through at least one or preferably a plurality of slots that extend through one of the major walls of the connector housing.

The invention is further directed to a memory card having a ground plate electrically connected to pins within the card and having a plurality of corresponding raised conductive surfaces on an outwardly facing conductive surface of the shielded card whereby upon inserting the shielded card into the shrouded connector the conductive raised surfaces engage corresponding recessed spring fingers.

BRIEF DESCRIPTION OF THE DRAWINGS

An embodiment of the invention will now be described by way of example with reference to the accompanying drawings.

FIG. 2 is a cross-sectional view of the assembled connector and card of FIG. 1 showing the interconnection of the conductive shroud with the ground plate of the card;

FIG. 3 is an enlarged fragmentary portion of FIG. 2 illustrating the insertion of the improved shielded card being inserted into the connector of FIG. 1;

FIG. 4 is an enlarged fragmentary view similar to that of FIG. 3 illustrating the insertion of an unshielded card into the connector of FIG. 1;

FIG. 5 is an exploded view of the ground plate and connector included within the memory card of the present invention;

FIG. 6 is a side view of the assembled connector and ground plate in view of FIG. 5;

FIG. 7 is an exploded view of an alternative embodiment of the connector and shield assembly made in accordance with the present invention;

FIG. 11 is a cross-sectional view of a two connector array and shroud incorporating the teachings of the present invention.

DETAILED DESCRIPTION OF THE DRAWINGS

Figure 1:
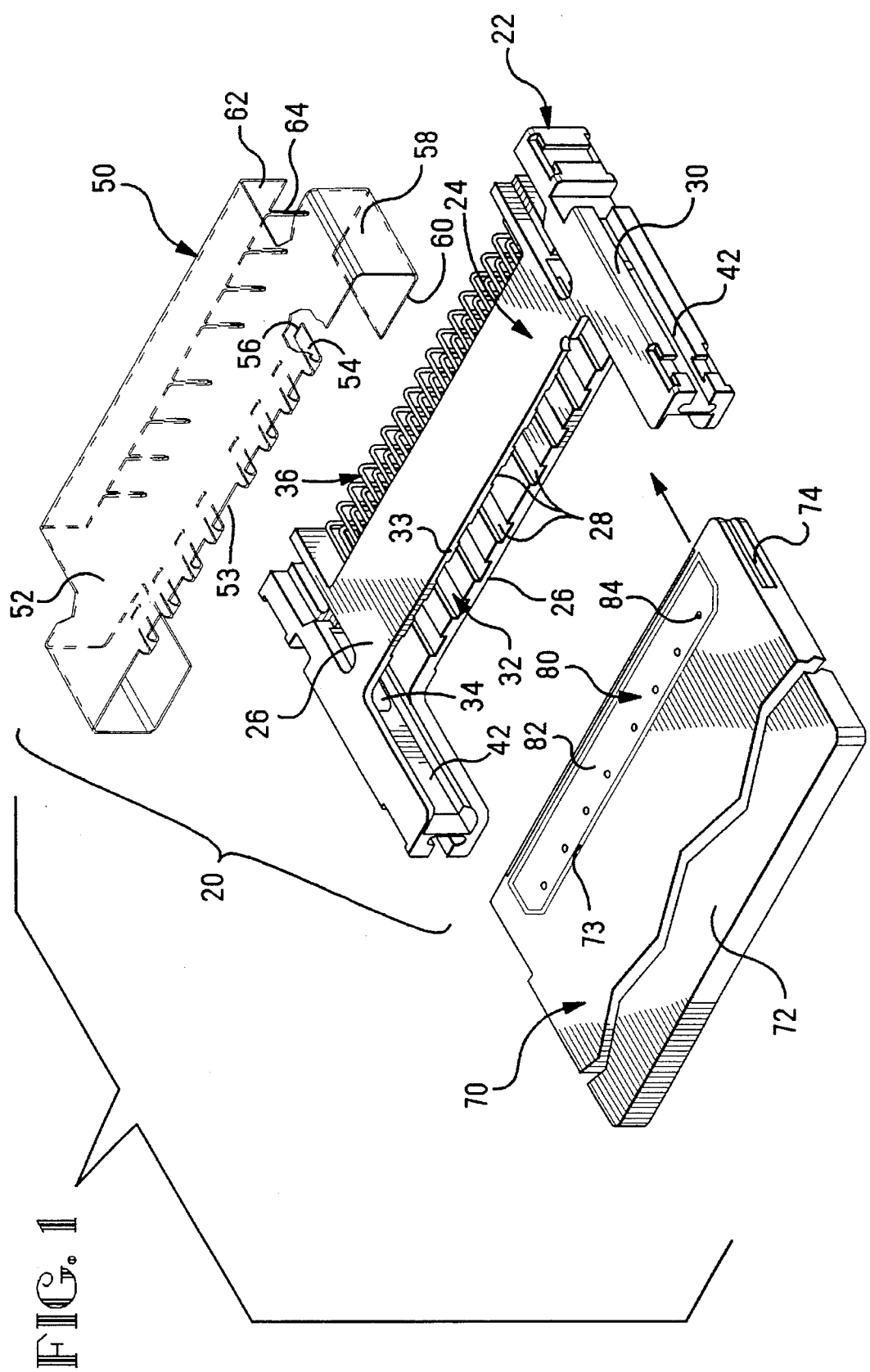
FIG. 1 is a perspective view of the electrical connector of the present invention with shroud exploded from the connector and an improved grounded card in alignment for being received in the card receiving slot.

Electrical connector assembly 20 of the present invention includes electrical connector 22 and a shroud 50. For purposes of illustrating the invention connector 22 is shown as a connector for a card reader. It is to be understood that the improved connector assembly of the present invention may also be used with receptacle connectors to be mated with shielded or unshielded plug connectors.

The connector 22 of the present invention includes a housing 24 having opposed major sides 26, and opposed minor sides 30 together defining a card receiving mouth 32. A portion of the card receiving mouth 32 defines a card receiving space 34. A plurality of electrical terminals 36 are disposed within the housing 24, the terminals 36 having first and second connecting portions 38,40 respectively. The first connecting portions 38 extend into the card receiving space 34 and are adapted for mating with complementary terminals of the memory card 70. The second connecting portions 40 are shown as terminal pins adapted for being received in respective apertures circuit board (not shown). At least one of the major sides 26 of the housing includes a plurality of finger receiving recesses 28 extending at least partially outwardly to the leading edge 33 of the card receiving mouth 32. In the embodiment illustrated, connector 22 further includes card guide arms 42 extending outwardly thereof for receiving the card 70.

Conductive shroud 50 is a unitary member including a top plate surface 52 having a plurality of spring fingers 54 extending from the leading edge 53 thereof. Shroud 50 includes side walls 58 extending from the top plate 52. Shroud 50 further includes lower flanges 60 extending from the side walls 58 and are adapted to extend beneath the connector housing 24. The flanges 60 may serve as conductive pads that can be secured and referenced to ground electrical potential by being electrically connected to corresponding pads on a circuit board as discussed in U.S. Pat. No. 5,288,247. Shroud 50 further includes a backwall 62 having a plurality of terminal members 64 extending downwardly therefrom for electrical engagement with ground circuits in the circuit board.

Multiple resilient spring contact fingers 54 extend from the leading edge 53 of the shroud and upon assembly extend into the card receiving mouth 32. The leading ends 56 of the spring fingers 54 are adapted to be received in the respective spring finger recesses 28 in one of the major sides 26 of housing 24 whereby the spring fingers 54 lie closely adjacent the card receiving space 34. The shield 50 is assembled to the connector 22 by placing the plate 52 over side 26, sliding the fingers 54 into position and wrapping the side edges 58 around the housing 24.

The present invention is also directed to an improved memory card 70, which includes a ground plate or conductive surface 80 on an outwardly facing surface 72 of a shielded card 70. The shield 80 includes top surface 82 having a plurality of raised conductive areas 84 adapted to engage the recessed spring fingers 54 of the shroud 50 upon insertion of the card 70 into the assembly 20, as shown in FIGS. 2 and 3.

As the card 70 is inserted into the mouth 32 and into the corresponding card receiving portion 34, each of the raised surfaces 84 wipes frictionally against the leading end 56 of the corresponding spring finger 54 thereby establishing electrical contact between the ground reference plane and biasing the spring contact fingers 54 further into the respective recesses 28.

FIG. 4 shows the insertion of a standard card 170 into the card receiving slot 34 of assembly 20. Card 170 includes no raised conductive surfaces, therefore, card 170 can be fully inserted into the card receiving space without engaging the recessed spring fingers 54. Thus even if the outer surface of card 170 is conductive, the spring fingers 56 remain isolated from the memory card thereby assuring that neither an improper connection to ground nor electromagnetic interference problems are created.

FIGS. 5 and 6 illustrate the construction of the card assembly 70 of the present invention with the outer covers 72 removed. The card assembly 70 includes a connector 74 and circuit board 90. The connector 74 includes a housing 76 having a plurality of terminal members therein having contact portions 78 extending outwardly from the housing 76 upon assembly of the memory card 70, contact portions 78 are electrically connected to contact pads 92 on circuit board 90. A ground plate 80 includes a plate like portion 82 having a plurality of raised conductive surfaces 84 extending at a selected location adjacent an edge thereof, and a corresponding plurality of terminal spring arms 86 extending outwardly from plate 80 along the same edge. Upon assembling card 70, spring arms 86 are electrically connected to ground contact pads 94 on circuit board 90. Plate 82 further includes side portions 88 for engaging and being secured to the connector housing 74. As shown in FIG. 6, upon assembling ground plate 80 to the connector housing 76, the spring arms 86 are spaced between terminal pins 78 and upon inserting the circuit board 90 between terminal pins 78 and spring arms 86, and soldering thereto, the ground path is completed between ground circuits of the card and the corresponding conductive portion 84 on the outer surface 82 of the ground plate 80. For purposes of clarity, solder has been omitted from FIG. 6. As shown in FIG. 1, the outer covers 72 secures the connector 74 and its associated circuit board 90 therebetween to form the memory card 70. As also shown in FIG. 1, the ground plate 80 is spaced at 73 and electrically isolated from the surfaces of covers 72. Thus the covers 72 may be made of insulated or conductive material. To get proper grounding it is important that the ground plate 80 remain electrically isolated from any conductive material that is exposed on the outer surface of the memory card 70.

FIG. 7 shows a further embodiment 120 of the connector assembly including a connector 122 having a housing 124 and opposed major surfaces 126. At least one of the major surfaces 126 includes spring finger receiving slots 128 extending through the wall 126. The embodiment of housing 124 can be used with the shield 50 as previously illustrated or with an alternative embodiment of the shield 150 in which the leading ends of the spring fingers 156 are secured to the under surface of top plate 152. The shield 150 is assembled to connector housing 124 in the same manner as previously described.

Figure 8:
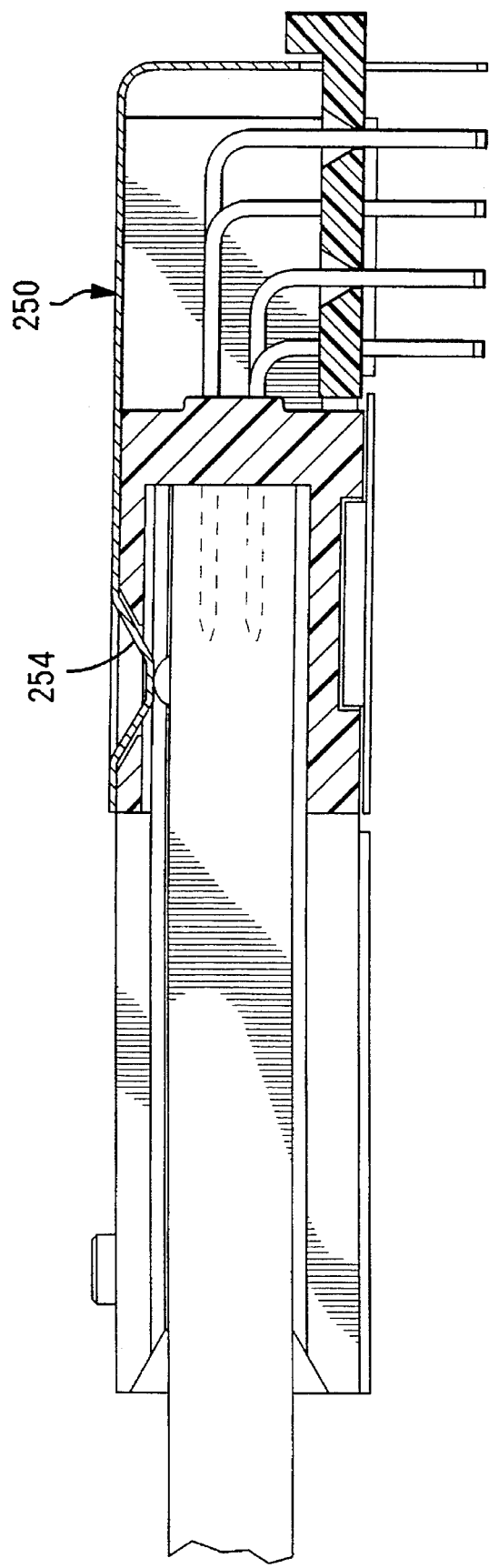
FIG. 8 is a cross-sectional view of a further alternative embodiment of the shield and connector of the present invention.
Figure 9:
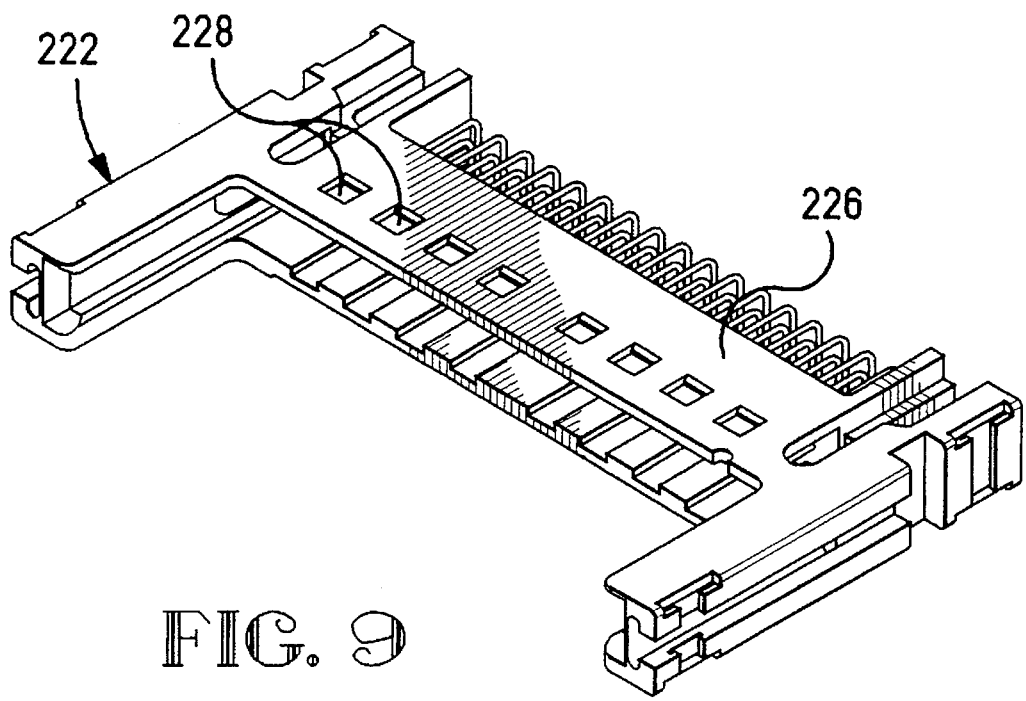
FIG. 9 is a perspective view of the housing used with the shield illustrated in FIG. 8.
Figure 10:
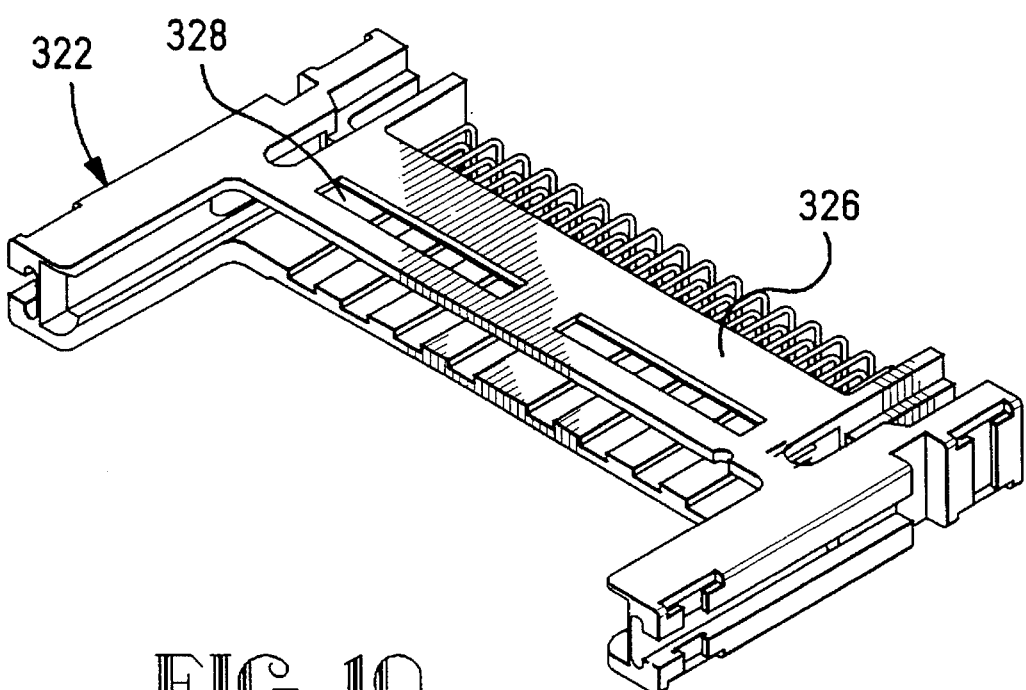
FIG. 10 is an alternative embodiment of the housing also usable with the shield of FIG. 8.

FIGS. 8, 9 and 10 show further alternative embodiments of the shield and housing members. In FIG. 8 the shield 250 includes a plurality of inwardly spaced contact portions 256 extending into the recess 228 and engaging the raised conductive surface 84 on the edge of the memory card 70. FIG. 9 shows the connector 222 having a plurality of isolated recesses 228 extending into the major side 226 for receiving resilient portion 256 of shield 250. FIG. 10 shows a further alternate embodiment wherein the wall 326 of the housing 322 includes an elongated slot 328 for receiving the resilient portion 256 of shield 250.

FIG. 11 shows another alternative embodiment of the shield similar to that in U.S. patent application Ser. No. 08/235,617 previously incorporated by reference. The spring fingers 456 are recessed within the housing walls 426 and engage the improved card 70 of the present invention. The embodiment 422 of FIG. 11 allows memory cards to be mixed and matched with shielded and unshielded versions as required.

It is thought that the electrical connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. An electrical connector assembly for mating with a complementary electrical module, said assembly comprising:

an electrical connector including a housing having opposed major sides and minor sides defining a module receiving mouth, a plurality of conductive electrical terminals disposed in said housing and having portions thereof extending into said module receiving mouth; and a conductive shroud encircling said housing, said shroud having inwardly spaced contact portions extending into said mouth along at least one of said major sides of said housing, said shroud contact portions being spaced from said electrical terminals;

said at least one of said major sides of said housing includes at least one shroud contact receiving recess extending at least partially outwardly to the leading edge of said module receiving mouth and at least partially to an outer housing surface from an inner housing surface of said at least one major side, said at least one recess being adapted to receive said shroud contact portions therein upon connector assembly such that engageable portions of said shroud contact portions are closely adjacent said module receiving mouth thereby being positioned to be either electrically engaged by corresponding raised conductive surfaces on an outwardly facing conductive surface of a shielded module upon insertion of said shielded module into said module receiving mouth, or to remain spaced from surfaces of an unshielded module upon inserting said unshielded module into said mouth;

whereby said connector is suitable for use with shielded as well as unshielded modules.

2. The connector assembly of claim 1 wherein said electrical module is a memory card.

3. The connector assembly of claim 1 wherein said inwardly spaced contact portions are spring fingers extending into said mouth from an edge of said shroud.

4. The connector assembly of claim 1 wherein said inwardly spaced contact portions are dimples expressed into said mouth from an outer surface of the shroud.

5. The connector assembly of claim 4 wherein said at least one shroud contact receiving recess is a slot extending through and along said at least one major side of said housing and associated with all said inwardly spaced contact portions therealong.

6. The connector assembly of claim 1 wherein said at least one major side of said housing includes a plurality of slots extending therethrough, each slot corresponding to a corresponding shroud contact portion.

7. The connector assembly of claim 1 wherein said at least one major side housing includes a plurality of shroud contact receiving recesses extend to the leading edge of said module receiving mouth and extending partially to said outer housing surface.

8. The connector assembly of claim 1 wherein said at least one major housing side includes a plurality of shroud contact receiving recesses extending to the leading edge of said module receiving mouth and extending through said at least one major outer housing side defining shroud contact receiving slots.

9. An improved electrical connector for a card reader, said connector of the type including an insulative housing having opposed major sides and minor sides defining a card receiving mouth, a portion thereof being a card receiving space, a plurality of conductive electrical terminals disposed in said housing and having portions thereof extending into said card receiving space, a conductive shroud encircling said housing, said shroud having spring fingers extending therefrom and into said mouth along at least one of said major sides of said housing, said spring fingers being spaced from said electrical terminals, the improvement comprising:

said at least one of said major sides of said housing includes a plurality of finger receiving recesses extending at least partially outwardly to the leading edge of said card receiving mouth, said slots being adapted to receive leading portions of corresponding ones of said spring fingers therein upon connector assembly such that said spring fingers include engageable portions closely adjacent said card receiving space thereby being positioned to be either electrically engaged by corresponding raised conductive surfaces on an outwardly facing conductive surface of a shielded card upon insertion of said shielded card into said card receiving space of said mouth, or to remain spaced from surfaces of an unshielded card upon inserting said unshielded card into said card receiving space of said mouth;

whereby said connector is suitable for use with shielded as well as unshielded cards.

10. The improved electrical connector of claim 9 wherein said finger receiving recesses extend to the leading edge of said card receiving mouth.

11. The improved electrical connector of claim 9 wherein said finger receiving recesses extend through said at least one major side defining finger receiving slots.

12. The improved electrical connector of claim 11 wherein said-finger receiving slots extend to the leading edge of said card receiving mouth.

13. The improved electrical connector of claim 12 wherein leading ends of said spring fingers are secured to said shroud.

14. An electrical assembly including a shrouded electrical connector mated with a complementary electrical module, said assembly comprising:

said shrouded electrical connector including a dielectric housing having opposed major sides and minor sides defining a module receiving mouth, a plurality of conductive electrical terminals disposed in said housing and having portions thereof extending into said module receiving mouth; and a conductive shroud encircling said housing, said shroud having inwardly spaced contact portions extending into said mouth along at least one of said major sides of said housing, said shroud contact portions being spaced from said electrical terminals; said at least one of said major sides of said housing includes at least one shroud contact receiving recess extending at least partially outwardly to a leading edge of said module receiving mouth, said at least one recess being adapted to receive said shroud contact portions therein upon connector assembly such that engageable portions of said shroud contact portions are closely adjacent said module receiving mouth; and said complementary electrical module including an outwardly facing conductive surface having raised conductive surfaces thereon, said raised conductive surfaces being in electrical engagement with corresponding ones of said shroud contact portions when said complementary electrical module is inserted into said module receiving mouth.

15. The connector assembly of claim 14 wherein said electrical module is a memory card.

16. The connector assembly of claim 14 wherein said inwardly spaced contact portions of said shroud are spring fingers extending into said mouth from an edge of said shroud.

17. The connector assembly of claim 14 wherein said inwardly spaced contact portions of said shroud are dimples expressed into said mouth from an outer surface of the shroud.

* * * * *